March 26, 1935.  F. G. THOMAS  1,995,785
DRAWBAR AND COUPLING FOR LAWN MOWERS
Filed Sept. 12, 1933
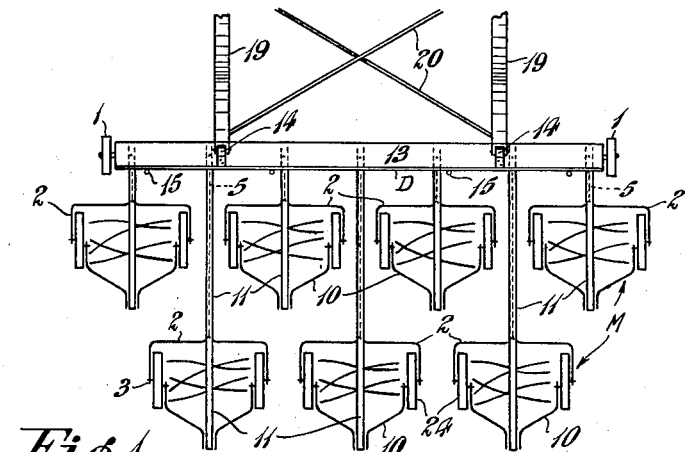
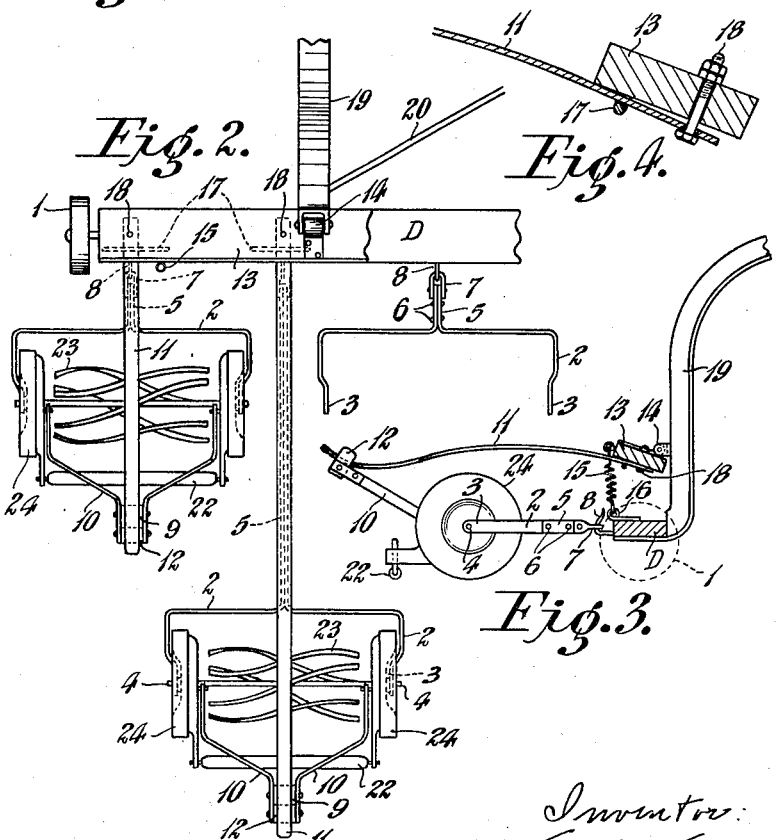

Patented Mar. 26, 1935

1,995,785

UNITED STATES PATENT OFFICE 1,995,785

DRAWBAR AND COUPLING FOR LAWN MOWERS

Frederick Graeme Thomas, Berrigan, New South Wales, Australia

Application September 12, 1933, Serial No. 689,120
In Australia October 5, 1932

7 Claims. (Cl. 56—7)

This invention has been designed for the purpose of providing means for enabling a series of ordinary manually operated rotary lawn mowers to be coupled together in the form of a gang and simultaneously operated to enable a wide strip of lawn or grass to be mown and thereby expeditiously trim an extensive grass covered area as for instance fairways and putting greens of golf courses.

The invention consists in the provision of a draw-bar, means for coupling the series of mowers to said draw-bar and maintaining said mowers in operative relationship with the lawns, said combined implement being operated by horse or traction power.

The mowers are arranged in a single row or in a plurality of rows and in staggered relationship and in the latter case with the mowers in the advance row spaced approximately the width of same apart and the following mowers located in such positions as to operate over the strips of the surface that escape the mowers in advance.

A practical form of the invention is illustrated in the accompanying drawing showing a series of seven coupled mowers arranged in two rows.

Fig. 1 is a diagrammatic plan of a series of mowers and the coupling mechanism.

Fig. 2 is an enlarged plan of part of Fig. 1.

Fig. 3 a vertical section illustrating the drawbar and coupling means.

Fig. 4 is an enlarged detail illustrating a tension-adjusting bolt.

The mowers M which are preferably of uniform type and size are arranged according to the construction illustrated in two rows, with the mowers in the front row spaced apart a distance slightly shorter than the width of the mowers in the second row so that the latter mowers will operate over the strips of ground surface that escape the mowers in the front row.

In front of the front row of mowers there is a draw-bar D mounted on ground wheels 1 and the mowers are detachably connected to said draw bar. As illustrated a yoke 2 for each mower is connected at its ends 3 to the ends of the axle 4 of a mower and said yoke has a forwardly extending bridle or coupling bar 5 that is detachably connected to said draw bar.

According to the construction illustrated the yoke 2 is made in two like parts with the shank portions secured to bolts 6 to form the coupling bar 5 which is provided with a shackle 7 that engages a hook 8 fixed to the rear of the draw bar.

The bridle or coupling bars 5 connecting the second row of mowers to the draw bar are necessarily longer than those connecting the first row of mowers.

The wooden portion of the ordinary handle 9 of each mower is shortened and merely a small piece of same left between the usual metal brackets 10 that are connected to the sides of the frame of the mower.

A spring 11 of the flat metal or leaf type is connected with a pressure bar 13 at one end and bears at its other end on each handle 9 which is provided with a channel guide 12 to guide and retain the rear end of the spring in position. Each spring 11 is of such a length as to suit the handle of the particular mower controlled by the spring.

The pressure bar 13, provided above the draw bar D serves for applying tension on all the springs. To this end the pressure bar is connected at the front by hinges 14 to the shafts 19 fixed to said draw bar and the latter and said pressure bar are connected at the rear by detachable springs 15 each fixed for instance to the pressure bar and connected to a hook 16 or the like on the draw bar.

If desired the pressure bar may be hinged to upwardly extending projections on the draw bar.

The front end of each spring 11 passes through a guide 17 (Fig. 4) on the underside of the pressure bar 13 and its end is connected to a bolt 18 which is screwed through said bar and turnable for the purpose of varying the tension of the spring 11, said bolts being provided at their upper ends with nuts. In Fig. 4 the spring 11 is shown as relaxed, while in Fig. 3 the spring 11 is illustrated as bearing down on the handle 10. It is the adjusting bolt 18 which permits the variation in tension in the spring 11, as clearly evident from these two figures. Referring to Fig. 4 it will be seen that by tightening the nuts on bolt 18, the head on its lower end raises the right hand end of spring 11 thus causing the outer end to be lowered on the outer end of handle 10. Consequently spring 15 operates quicker, and so causes spring 11 to apply a greater pressure on handle 10.

Means are also provided to vary the tension of each spring 15 and consequently the pressure applied to the handles of the mowers and thus maintain said mowers in effective working position.

The bent wooden shafts 19 for the horse may be stiffened by braces 20 formed of iron.

It will be understood by the foregoing description that the springs 11, adjusted to the correct tension, bear on the short handles of the mowers and keep the rollers 22 of the latter on the ground and consequently maintain all of said mowers in effective operating positions so that a broad strip of grass can be cut as the implement is drawn forward, each mower working independently and uncontrolled by its fellow.

By releasing the springs 15 the pressure bars 13 and with the same the springs 11 can be swung upwardly past the vertical so that by engaging the handles of the mowers the rotary cutters 23 and rollers 22 of said mowers may be swung upwardly out of action in the usual manner, which permits the mowers being idly drawn along on their wheels 24.

I claim:—

1. In combination, a series of lawn mowers provided with handles, a draw bar mounted on ground wheels, readily releasable means attaching said lawn mowers to said draw bar, a pressure bar located above said draw bar, pressure springs bearing on the respective handles and connected with said pressure bar, and means permitting immediate release of pressure of said springs on the handles of the mowers.

2. In combination, a series of lawn mowers, a draw-bar mounted on ground wheels, means coupling said mowers to said draw-bar, a handle on each mower, a pressure bar mounted on hinges, means to maintain said pressure bar in operative position, pressure springs bearing on the respective handles and connected with said pressure bar.

3. In combination a series of lawn mowers, a draw-bar mounted on ground wheels, means coupling said mowers to said draw-bar, a handle on each mower, a pressure bar mounted on hinges, springs detachably connected to said pressure bar and the draw-bar, pressure springs bearing on the respective handles and connected with said pressure bar.

4. In combination a series of lawn mowers, a draw-bar mounted on ground wheels, means coupling said mowers to said draw-bar, a handle on each mower, a pressure bar provided with tension adjusting bolts and guides and mounted on hinges detachably connected to said bar and the draw-bar, pressure springs bearing on the respective handles and passed through said guides and attached to said tension adjusting bolts.

5. In combination, a series of lawn mowers provided with handles, a draw bar mounted on ground wheels, readily releasable means attaching said lawn mowers to said draw bar, a guide on each handle, a pressure bar located above said draw bar, and pressure springs bearing at one end on the respective handles and engaging the guides thereon and connected with said pressure bar at their other ends.

6. In combination, a series of lawn mowers provided with handles, a draw bar mounted on ground wheels, each mower being provided with an axle, a yoke connected with the ends of the axle of each mower, a coupling bar for each yoke, readily releasable means connecting the coupling bars with said draw bar, a pressure bar located above said draw bar, pressure springs bearing on the respective handles and connected with said pressure bar, and means permitting immediate release of pressure of said springs on the handles of the mowers.

7. In combination, a series of lawn mowers provided with shortened handles, a draw-bar mounted on ground wheels and provided with shafts, means coupling said mowers to said draw bar, a hinged pressure bar above said draw bar, springs detachably retaining said pressure bar in position and springs bearing on the respective handles and connected with said pressure bar.

FREDERICK GRAEME THOMAS.